(12) United States Patent  (10) Patent No.: US 9,187,248 B2
Ribau  (45) Date of Patent: Nov. 17, 2015

(54) ROLLER CONVEYING MODULE WITH SEPARATING DEVICE

(75) Inventor: Yannick Ribau, Les Sorinières (FR)

(73) Assignee: Interroll Holding AG, Sant' Antonino (CH)

( * ) Notice: Subject to any disclaimer, the term of this patent is extended or adjusted under 35 U.S.C. 154(b) by 0 days.

(21) Appl. No.: 14/009,073

(22) PCT Filed: Mar. 30, 2012

(86) PCT No.: PCT/EP2012/055785
§ 371 (c)(1),
(2), (4) Date: Dec. 24, 2013

(87) PCT Pub. No.: WO2012/131034
PCT Pub. Date: Oct. 4, 2012

(65) Prior Publication Data
US 2014/0116838 A1    May 1, 2014

(30) Foreign Application Priority Data
Mar. 30, 2011    (DE) .............. 20 2011 004 513 U (51) Int. Cl.
*B65G 47/29* (2006.01)
*B65G 13/075* (2006.01)
(Continued)

(52) U.S. Cl.
CPC .......... *B65G 13/075* (2013.01); *B65G 13/065* (2013.01); *B65G 13/12* (2013.01);
(Continued)

(58) Field of Classification Search
CPC ...... B65G 13/12; B65G 13/065; B65G 47/29; B65G 47/8823; B65G 47/8815; B65G 47/883
USPC ........... 193/35 SS, 35 G, 35 A; 198/782, 368, 198/419.1, 459.6, 463.4, 478.1, 589, 345.3; 414/535
See application file for complete search history.

(56) References Cited

U.S. PATENT DOCUMENTS 3,532,201 A * 10/1970 McConnell ................. 193/35 A
3,891,073 A * 6/1975 Coleman et al. ............ 193/35 A
(Continued)

FOREIGN PATENT DOCUMENTS

CN   201305355 Y   9/2009
DE   3243086 C1   6/1984
(Continued)

OTHER PUBLICATIONS

International Search Report mailed Jun. 19, 2012 in PCT Application No. PCT/EP2012/055785, 6 pages.
(Continued)

*Primary Examiner* — Leslie A Nicholson, III
(74) *Attorney, Agent, or Firm* — Kilpatrick Townsend & Stockton LLP (57) ABSTRACT

The invention relates to a roller conveyor module provided with a separation mechanism for a gravity-actuated roller conveyor system, comprising: a conveyor section, a movable blocking lever (10) comprising an arresting face (13) and a blocking portion (11), a movable locking element (20) comprising a locking face (21) and a movable actuating lever (40) disposed downstream from the blocking lever (10) in the conveying direction of the conveyor module, a coupling mechanism (30) for mechanically coupling the actuating lever to the locking element (20) in such a way that, as a result of said coupling action, said locking element is moved into the unlocking position when the actuating lever is in the trigger position and is moved into the locking position when the actuating lever is in the holding position.

8 Claims, 9 Drawing Sheets

(51) Int. Cl.
*B65G 13/12* (2006.01)
*B65G 47/88* (2006.01)
*B65G 13/06* (2006.01)

(52) U.S. Cl.
CPC ............ *B65G 47/29* (2013.01); *B65G 47/883* (2013.01); *B65G 47/8815* (2013.01); *B65G 47/8823* (2013.01); *B65G 2205/04* (2013.01)

(56) References Cited

U.S. PATENT DOCUMENTS

| | | | |
|---|---|---|---|
| 4,185,729 A | | 1/1980 | Obermeyer |
| 4,646,909 A | * | 3/1987 | vom Stein .................. 198/460.1 |
| 5,213,189 A | * | 5/1993 | Agnoff ........................ 193/35 A |
| 6,234,292 B1 | * | 5/2001 | Schut .......................... 193/35 A |
| 6,763,930 B2 | * | 7/2004 | Johnson et al. ............ 198/459.6 |
| 7,607,530 B2 | * | 10/2009 | Ueno et al. ................ 198/345.3 |

FOREIGN PATENT DOCUMENTS

| | | |
|---|---|---|
| DE | 3417158 A1 | 11/1985 |
| DE | 4309222 A1 | 9/1993 |
| DE | 19502888 A1 | 9/1995 |
| DE | 4 413 475 A1 | 10/1995 |
| DE | 196 36 842 A1 | 3/1997 |
| EP | 0164527 A1 | 12/1985 |
| EP | 0418938 A1 | 3/1991 |
| EP | 1 897 823 A2 | 3/2008 |
| EP | 1897823 A2 | 1/2009 |
| EP | 1897823 A3 | 1/2009 |

OTHER PUBLICATIONS

Canadian Office Action mailed Feb. 24, 2015 in CA Patent Application No. 2,831,876, 4 pages.
Chinese Office Action mailed Dec. 31, 2014 in CN Patent Application No. 201280027101.7, 10 pages.

* cited by examiner

ROLLER CONVEYING MODULE WITH SEPARATING DEVICE

This application is a National Stage of International Application No. PCT/EP2012/055785, filed Mar. 30, 2012, which claims the benefit of German Application No. DE 20 2011 004 513.7, filed on Mar. 30, 2011, the disclosures of which are incorporated by reference herein.

The invention relates to a roller conveyor module provided with a separation mechanism for a gravity-actuated roller conveyor system.

In a gravity-actuated roller conveyor system, the conveyed item is conveyed on a downwardly inclined conveyor path. Such conveyor sections arranged at an incline to the horizontal may be combined with other conveyor sections in which the conveyed item is moved by a drive on the horizontal level or upwards.

One area where gravity-actuated roller conveyor sections are often used is at the end section of roller conveyor device, in which the conveyed items are placed in order to remove them from the roller conveyor device. One example of this is the arrangement of conveyed items on pallets which are arranged after completed conveying in a final conveyor module and which can be lifted off said final conveyor module by a forklift.

Providing a roller conveyor module for this purpose is basically known from the prior art. Such a roller conveyor module has an end stop at its rearwardmost end and is used to receive the conveyed products and to allow the conveyed products to be lifted off the conveyor. One problem in such roller conveyor modules is that many conveyed products may be lying on top of each other and may exert pressure on each other as a result. The last product, located between the end stop and the second-last product, may become trapped as a result, thus making it more difficult or impossible to remove that product, with the result that there is a risk of the product or the adjacent products being damaged.

Providing a separation mechanism in such roller conveyor modules, which ensures that a gap is maintained between the last and the second-last product arranged on the roller conveyor module, is basically known from the prior art. Such a separation mechanism allows the last product to be removed, without the pressure exerted on the last product by the following products making it more difficult to remove the last product.

A first problem encountered with such separation mechanisms is that they must allow reliable and fast conveying of the following products as soon as a last product has been taken off the roller conveyor module.

Another problem in such separation mechanisms is that items with very different weights must be conveyed and that they must also be reliably conveyed in immediate succession. There is therefore a need for a separation mechanism which achieves reliable separation of conveyed items even when a very light product is followed by a very heavy product, or when a very heavy product is followed by a very light product.

There is a need, finally, for a separation mechanism which ensures that no following product being conveyed comes into contact with the product being removed, even when removal is delayed and more particularly when there is a delay in vertically lifting the last conveyed product from the roller conveyor section.

The object of the invention is to provide a separation mechanism which has at least one and preferably a plurality of the required properties described in the foregoing.

This object is achieved, according to the invention, by a roller conveyor module comprising:

a conveyor section consisting of a plurality of conveyor rollers arranged one behind the other, wherein said conveyor section forms an upper support surface for conveyed items and is defined by the perimeter of the conveyor rollers, a movable blocking lever comprising an arresting face and a blocking portion, wherein said blocking portion extends in a blocking position across the support surface and causes a conveyed item on the support surface to be blocked, and can be pivoted to below the support surface or is located below the support surface in a release position and does not cause a conveyed item on the support surface to be blocked, a movable locking element comprising a locking face, which in a locking position is in contact with the arresting face and prevents movement of the blocking lever out of its blocking position in the direction of the release position, and in an unlocking position allows movement of the blocking lever out of its blocking position in the direction of the release position, and a movable actuating lever disposed downstream from the blocking lever in the conveying direction of the conveyor module, comprising an actuation portion which extends in a trigger position across the support surface, and in a holding position lies below or in the support surface, a coupling mechanism for mechanically coupling the actuating lever to the locking element in such a way that, as a result of said coupling action, said locking element is moved, or more particularly is pivoted into the unlocking position when the actuating lever is in the trigger position and is moved into the locking position when the actuating lever is in the holding position.

The roller conveyor module according to the invention has the advantage that it can reliably stop both heavy and light conveyed items at a waiting position with the aid of the blocking lever. The roller conveyor module according to the invention also has the advantage that it can release the blocking lever, in order to continue conveying, not only by means of a heavy conveyed item, but also by means of a light conveyed item which is removed from the roller conveyor module from an end position, so that a conveyed item blocked in such manner can be conveyed out of the waiting position into the end position. These functions are reliably performed for any combination of conveyed items from light to heavy.

This is achieved by subdividing the separation and release functions of the roller conveyor module among a total of at least three elements which are movable relative to each other and which cooperate with each other in a particular manner. Firstly, a blocking portion is provided on a blocking lever, and said blocking portion stops a conveyed item in the waiting position during the conveying motion of said item if the conveyed item projects beyond the support surface of the conveyor section, and releases the conveying motion when the conveyed item is moved under the support surface of the conveyor section.

A locking element is also provided which in the blocking situation is in contact with an arresting face formed on the blocking lever. Owing to this contact, the blocking lever is prevented by means of the locking element from being moved out of the blocking position into the release position. This position of the locking element is therefore called the locking position. If the locking element is moved out of the locking position into an unlocking position, then there is no longer this contact between the locking face and the arresting face, so the blocking lever is able to move into the release position, with the result that the conveyed item is no longer stopped by the blocking lever and can continue moving out of the waiting position along the conveyor section and into the end position.

The locking element is released from the locking position into the unlocking position by means of an actuating lever which is mechanically coupled to the locking element via a coupling mechanism. The actuating lever is disposed in the region of the end position and at a distance from the blocking lever and is positioned such that it is held in a holding position below the support surface by any conveyed item located in the end position downstream from the blocking lever in the conveying direction. In this holding position, the locking element is held in the locking position, and the blocking lever is held as a result in the blocking position. When the actuating lever moves out of this holding position into a trigger position, due to the conveyed item located above it moving away, for example by being lifted, then the locking element is moved into the unlocking position due to the mechanical coupling via the actuating lever, thus allowing movement of the blocking lever into its release position.

A lever within the meaning of this description and the claims should basically be understood to be a mechanical element which is movably guided. This movable guidance may consist in the lever being pivotable about an axis, or displaceable along a linkage or crank, or may consist in a composite movement of several articulated joints and connecting links.

According to a first preferred embodiment, the blocking lever is pivotably mounted about a blocking lever axle located below the support surface and in the release position is pivoted in relation to the blocking position about said blocking lever axle, the locking element is pivotably mounted about a locking element axis located below the support surface, and/or the actuating lever is pivotably mounted about an actuating lever axle located below the support surface.

These embodiments provide a preferred and robust form of mobility for the blocking lever, the locking element and the actuating lever, by making the latter pivotable about a defined axis. In addition, due to the arrangement of these axes below the support surface of the conveyor section, a compact structure is achieved without any guide elements, axles, deflection levers or the like.

It is still further preferred that the blocking lever is mounted pivotably about a blocking lever axle located below the support surface and the arresting face is formed on a roller located on the blocking lever, that the locking element has a locking face and an unlocking face adjacent to said locking face, the locking element and the blocking lever being moveably mounted in such a way that the roller rests in the locking position against the locking face, thereby blocking any pivoting movement of the blocking lever in a direction in which the blocking portion moves in the conveying direction, and that the roller rolls in the unlocking position along unlocking face when the blocking lever is pivoted in a direction in which the blocking portion moves in the conveying direction. This configuration achieves reliable cooperation between the arresting face and the locking face, due to the arresting face being embodied as a roller which is rotatably mounted on the blocking lever. Because of that, the blocking lever can be blocked reliably and in a targeted manner in one direction, thus preventing any items from being conveyed in the conveying direction. The blocking lever axle preferably lies between the blocking portion and the arresting face, thus providing advantageous leveraging at the blocking lever and allowing even heavy conveyed items to be blocked reliably. Due to a unlocking face being provided, it is also possible for the process of releasing the conveyed items to be carried out in a controlled manner, thus allowing any premature release of the conveyed items to be prevented.

In an alternative preferred embodiment, the blocking lever is pivotably mounted about a blocking lever axle located below the support surface, said axis having an arresting face and a locking face adjoining said arresting face, and a roller is disposed on the locking element, and the locking element and the blocking lever are movably mounted in such a way that the roller rests in the locking position against the arresting face of the blocking lever, thereby blocking any pivoting movement of the blocking lever in a direction in which the blocking face moves in the conveying direction, and the roller rolls in the unlocking position along the unlocking face when the blocking lever is pivoted in a direction in which the blocking portion moves in the conveying direction.

In this variant also, advantageous cooperation between the blocking lever and the locking element is achieved by a roller, but in this case the roller is rotatably mounted on the locking element. In the locking position, said roller rests against the arresting face and rolls along an unlocking face when the blocking lever is moved out of the blocking position into the release position, thus resulting in controlled release of the items for further conveying.

It is still further preferred that the locking element includes a locking lever and a locking hook which can be moved relative to the locking lever, that the locking hook is mechanically coupled to actuating lever and the locking lever and the locking hook are movably mounted in such a way that the locking hook is hooked in a securing position into the locking lever, and the locking lever is fixed in the locking position in which said locking lever blocks any pivoting movement of the blocking lever into the release position, and that the locking hook is moved, or more particularly is pivoted by the coupling to the actuating lever out of the secured position into an unsecured position, thereby releasing a pivoting movement of the locking lever out of the locking position and into the unlocking position when the actuating lever is moved out of its holding position into the release position.

This development of the invention provides additional safety and reliability by preventing the process of conveying the items blocked in the waiting position from being unintentionally triggered. A locking hook is provided for this purpose. Said locking hook is disposed and mounted in such a way that it has to be moved out of a locking position into an unlocking position in order to allow movement of the locking lever out of the locking position into the unlocking position. In this embodiment, the locking element which locks the blocking lever is therefore formed by two components that provide additional security for said locking mechanism. The one of these two elements, namely the locking hook, is actuated by the actuating lever by means of a mechanical coupling and can be moved out of a secured position into an unsecured position. Only in this unsecured position is it possible for the other one of said elements, namely the locking lever, to be moved out of the locking position and into the unlocking position, thus releasing the blocking lever and allowing it to move. The locking lever, for its part, may likewise be mechanically coupled to the actuating lever or may be mounted in such a way and mechanically biased, if necessary, or held in place by counterweights, that it automatically pivots into the unlocking position as a result of the forces transferred from the conveyed item and acting on it, when the locking hook releases it, and then pivots the locking lever automatically back into the locking position when there is no longer any force being exerted on the blocking lever by the conveyed item.

According to another preferred embodiment, the blocking lever is biased into the blocking position by a counterweight or a biasing force, the locking element is biased into the locking position by a counterweight or a biasing force and/or the actuating lever is biased into the trigger position by a counterweight or a biasing force.

With this configuration, the blocking lever and the locking element are biased or moved by weight force into the blocking position and the locking position, respectively. This provides security, in that the respective elements are prevented from remaining in a releasing position, and hence that a conveyed item is prevented from being conveyed further unintentionally. This also ensures that the blocking lever moves back into the blocking position immediately after a released item has passed it, and is locked into this blocking position by respective subsequent movements of the locking element.

It is still further preferred that the actuating lever can be moved out of a trigger position below the support surface into a holding position lying above the support surface, that the holding position is limited by an end stop, and that the actuating lever is mechanically coupled to the locking element in such a way that when the actuating lever is moved out of the holding position into the trigger position, the locking element is not moved into the unlocking position until 50-90%, preferably 60-80% of the total path between the holding and trigger positions has been completed, such that the blocking lever can be moved out of the locking into the release position.

This embodiment ensures that when a conveyed item lying in the end position is lifted, it does not immediately release a conveyed item lying at the waiting position such that a collision between the conveyed items might occur. Instead, the movement of the blocking lever out of the blocking position into the release position, thus allowing the next item to be conveyed from the holding position to the end position, is not permitted until the conveyed item being lifted out of the end position has been raised by a predetermined amount.

It is still further preferred that the actuating lever is spaced apart from the blocking lever by less than the length of a Europallet. With this configuration, it is possible for a distance between two conveyed items in Europallet format, said distance allowing items to be kept separate, to be complied with in a reliable manner.

According to another preferred embodiment, the actuating lever is connected to the locking element by a push or pull rod or by a traction cable. This configuration provides a resilient and robust mechanical coupling between the actuating lever and the locking element.

Finally, according to yet another preferred embodiment, an end stop is provided at the downstream end of the roller conveyor module in the conveying direction, said end stop preferably being spaced apart from the blocking lever by more than the length of a Europallet. With this configuration, an end position formed at the end of the conveyor module is defined by an end stop, thus reliably preventing any conveyed items from being conveyed beyond that end position.

Preferred embodiments of the invention shall now be described with reference to the attached Figures, in which.

Figure 1:
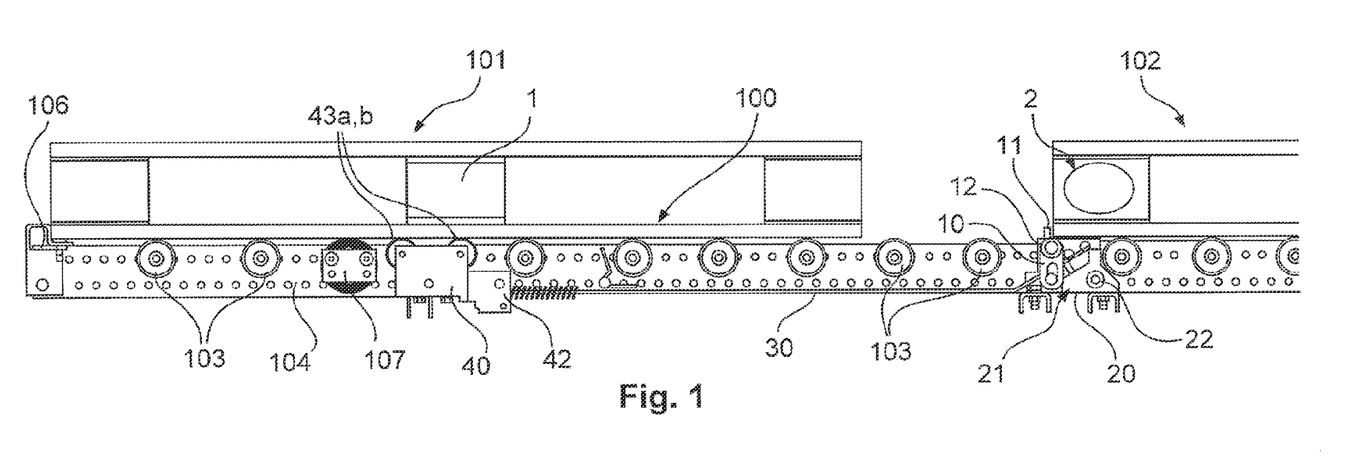
FIG. 1 shows a longitudinal cross-sectional side view of a first embodiment of a roller conveyor module according to the invention.

Referring firstly to FIG. 1, an end portion of a roller conveyor module is shown, in which a first conveyed item 1 is located in an end position 101 and a second conveyed item 2 is arranged in a waiting position 102. The roller conveyor module has a plurality of rollers 103 which are attached to and rotatably mounted in two laterally arranged longitudinal bars 104, 105. An end stop 106 which is not movable and which prevents conveyed item 1 in the end position from being conveyed further is disposed at the end of the roller conveyor module. A brake roller 107 is positioned such that it can brake a conveyed item which is being conveyed into the holding position, thus preventing the item from abruptly striking against end stop 106.

The second conveyed item 2 is held in its waiting position, at a side facing towards the first conveyed item 1, by a blocking portion 11 of a blocking lever 10. The blocking lever 10 is pivotably mounted by means of a blocking lever axle 12.

Blocking lever axle 12 is located between blocking portion 11 and an arresting face 13 on blocking lever 10. Stop face 13 is in contact with a locking face 21 on a locking element 20. The force transferred from conveyed item 2 to the blocking face is absorbed by the locking element in contact between the locking face and the arresting face.

Locking element 20 is pivotably mounted about a pivot axle 22 which is located, like blocking lever axle 12, below the support surface 100 of the roller conveyor module and which for its part is also located below the blocking lever axle. On the blocking lever, a roller 14 is rotatably and displaceably mounted in an elongate hole 15. Said roller 14 is the arresting face 13 of the blocking lever and rests against the locking face of locking element 20.

Locking element 20 is mechanically coupled to an actuating lever 40 by means of a pull rod 30. Actuating lever 40 is pivotably mounted about an actuating lever axle 42 mounted at the same height as the blocking element axle. The actuating lever has two rollers 43 a,b at its opposite end from the actuating lever axle, said rollers lying with their upper sides aligned with the upper sides of the conveyor rollers 103 of the roller conveyor module when the actuating lever is in the holding position shown in FIG. 1.

Figure 1A:
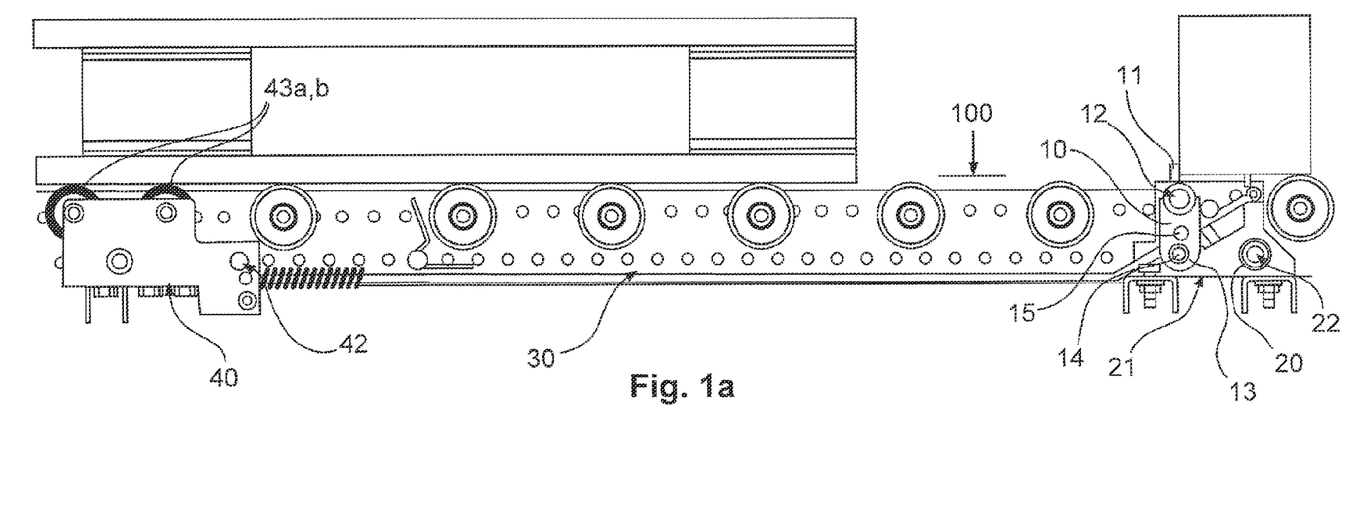
FIG. 1a shows a detailed view of a section from FIG. 1.
Figure 2:
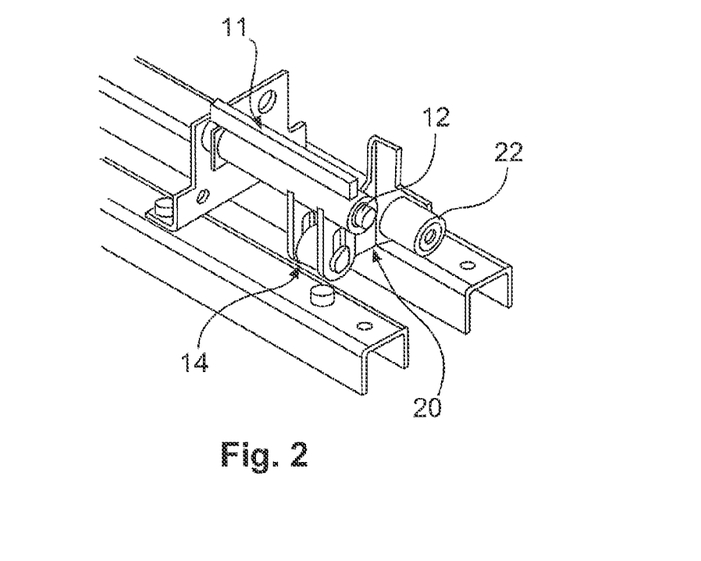
FIG. 2 shows a perspective detailed view of the embodiment according to FIG. 1.
Figure 3:
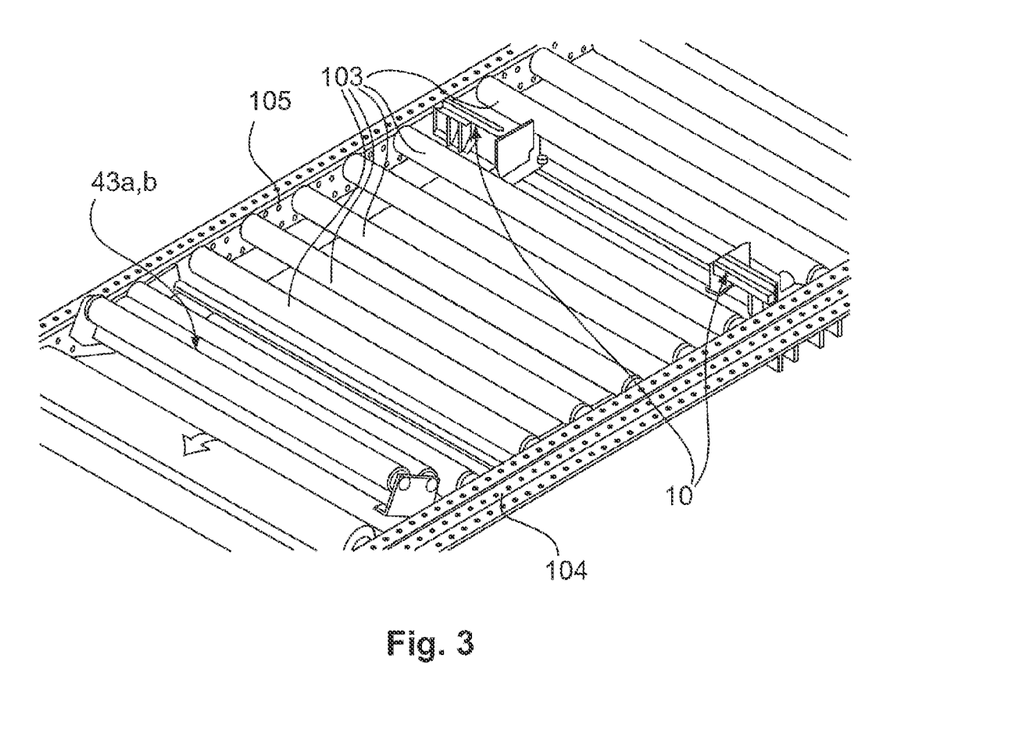
FIG. 3 shows a perspective plan view of the roller conveyor module according to the first embodiment, FIGS. 4 a-d show a process of separating conveyed items by means of the first embodiment.

In FIGS. 1 to 3, the roller conveyor module is shown in a functional position in which conveyed item 2 is held in the waiting position and prevented from being conveyed any further. For that purpose, actuating lever 40 is in the holding position, locking element 20 is in the locking position and blocking lever 10 is locked as a result in the blocking position.

As can be seen from FIG. 3, in particular, the two rollers 43a,b of the actuating lever extend across the entire width of the conveyor section formed by the conveyor module. It can also be seen that a total of two blocking levers are arranged at a height and at a point along the conveyor section and are each located adjacent to and on the inner side of longitudinal bars 104, 105 of the roller conveyor module.

The details of a separation process on the inventive roller conveyor module can be seen from FIGS. 4a-d. FIG. 1a shows the position in FIG. 1 in which two conveyed items 1 and 2 are held in an end position 101 and a waiting position 102, respectively, by end stop 106 and blocking lever 10, respectively.

Figure 4A:
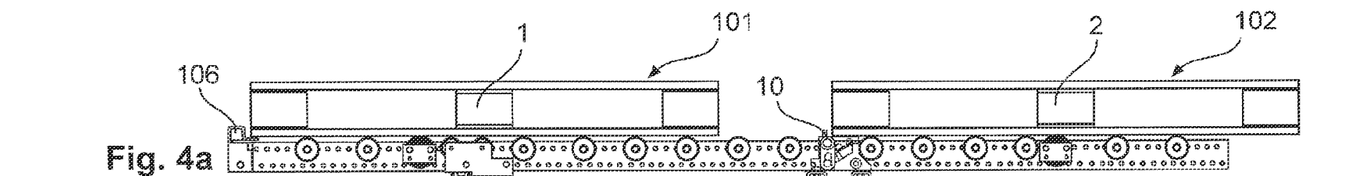
Figure 4B:
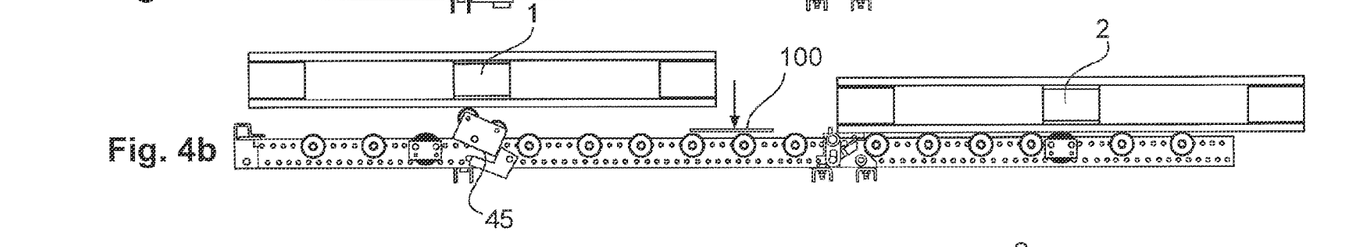
Figures 4C, 4D:
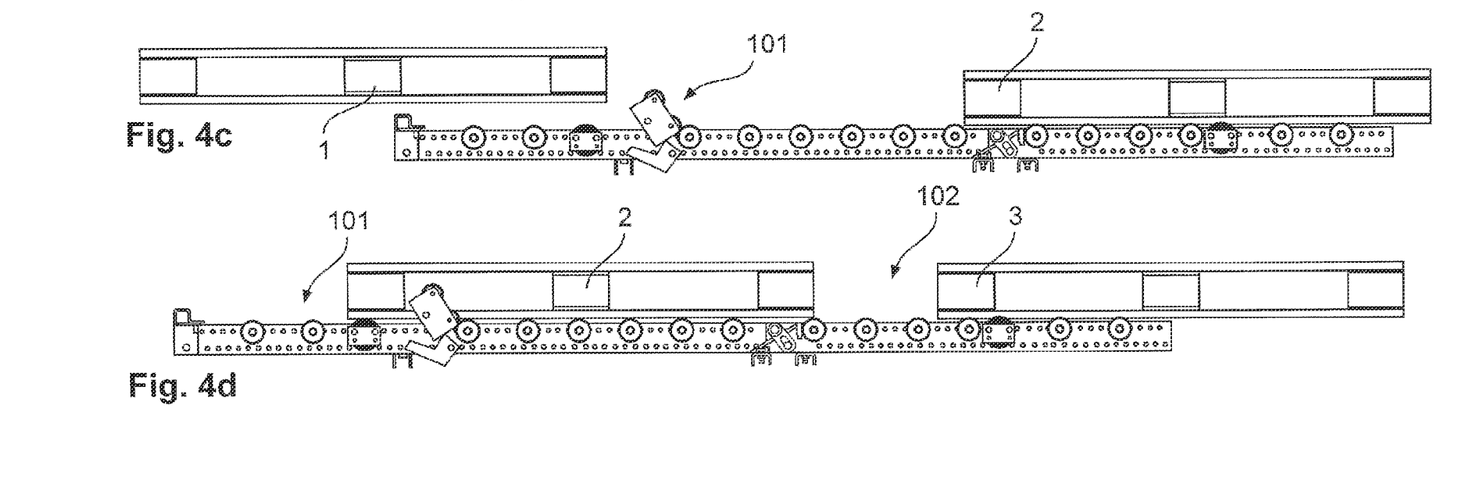
Figure 5:
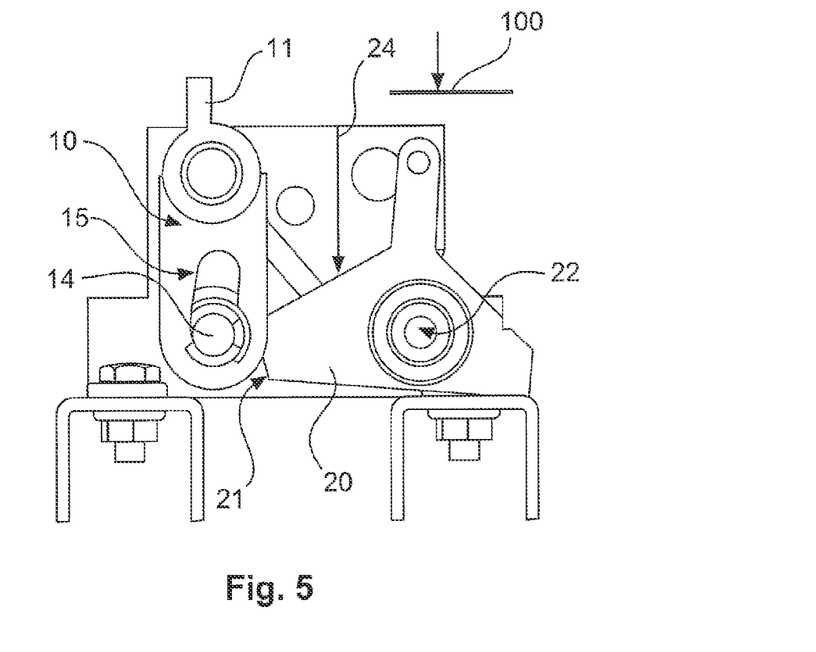
FIG. 5 shows a side view of a detail of the first embodiment in a locking position.

If conveyed item 1 is lifted, for example by a forklift, the actuating lever moves, due to a biasing force exerted by a spring, from its holding position into a trigger position, which it reaches after approximately 80% of its total path has been completed; this is illustrated in FIG. 4c. As soon as the actuating lever has reached its trigger position as shown in FIG. 4c, locking element 20 is pivoted by pull rod 30 out of its locking position as shown in FIG. 5 into the unlocking position shown in FIG. 6. Roller 14 on the blocking lever no longer rests against the locking face of the locking element, but can roll along unlocking face 24 and also moves translationally in the elongate hole 15 of the blocking lever. The blocking lever pivots as a result, thus causing blocking face 11 to move under the support surface 100 of rollers 103.

Figure 6:
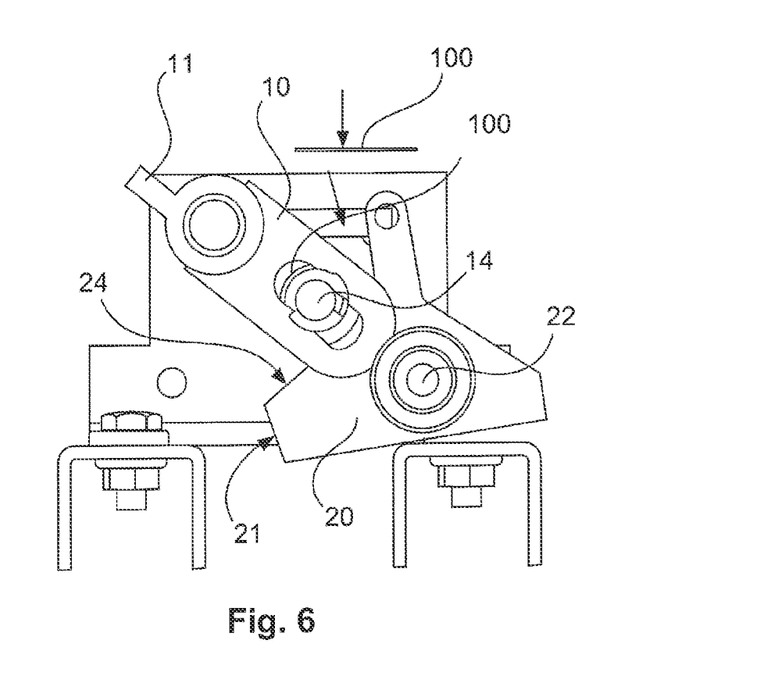
FIG. 6 shows a view according to FIG. 5, in a release position.

This pivoting of the blocking lever allows conveyed item 2 to be conveyed out of waiting position 102 into end position 101.

Conveyed item 2 moves into end position 101, braked by brake roller 107, after a specific path has been completed, and a third conveyed item 3 moves out of the preceding conveyor section into waiting position 102.

Figure 7:
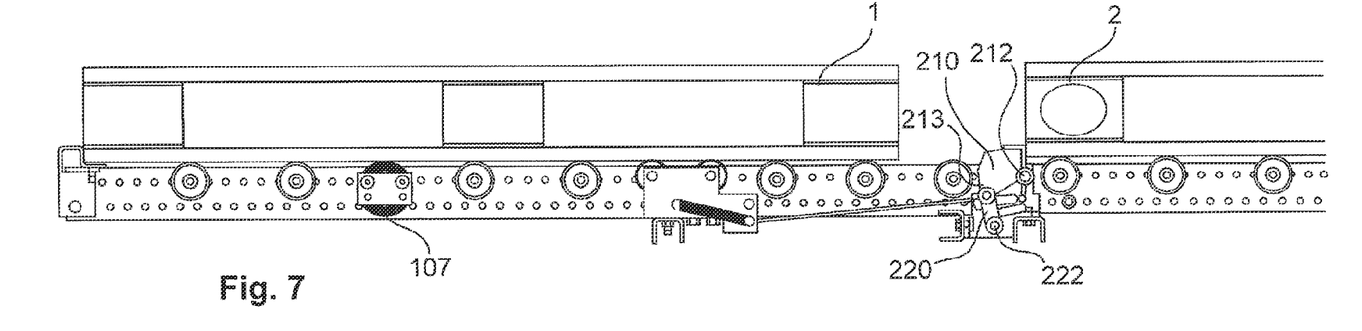
FIG. 7 shows a longitudinal cross-sectional side view of a second embodiment of a roller conveyor module according to the invention.
Figure 7A:
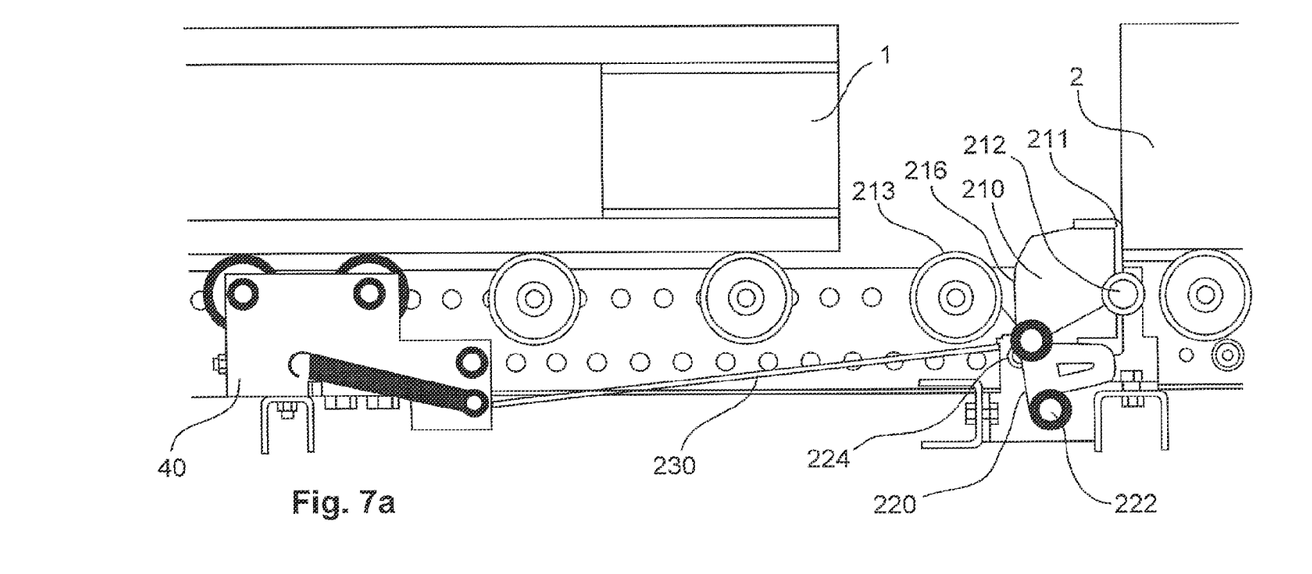
FIG. 7a shows a detailed view of a section from FIG. 1.
Figure 8:
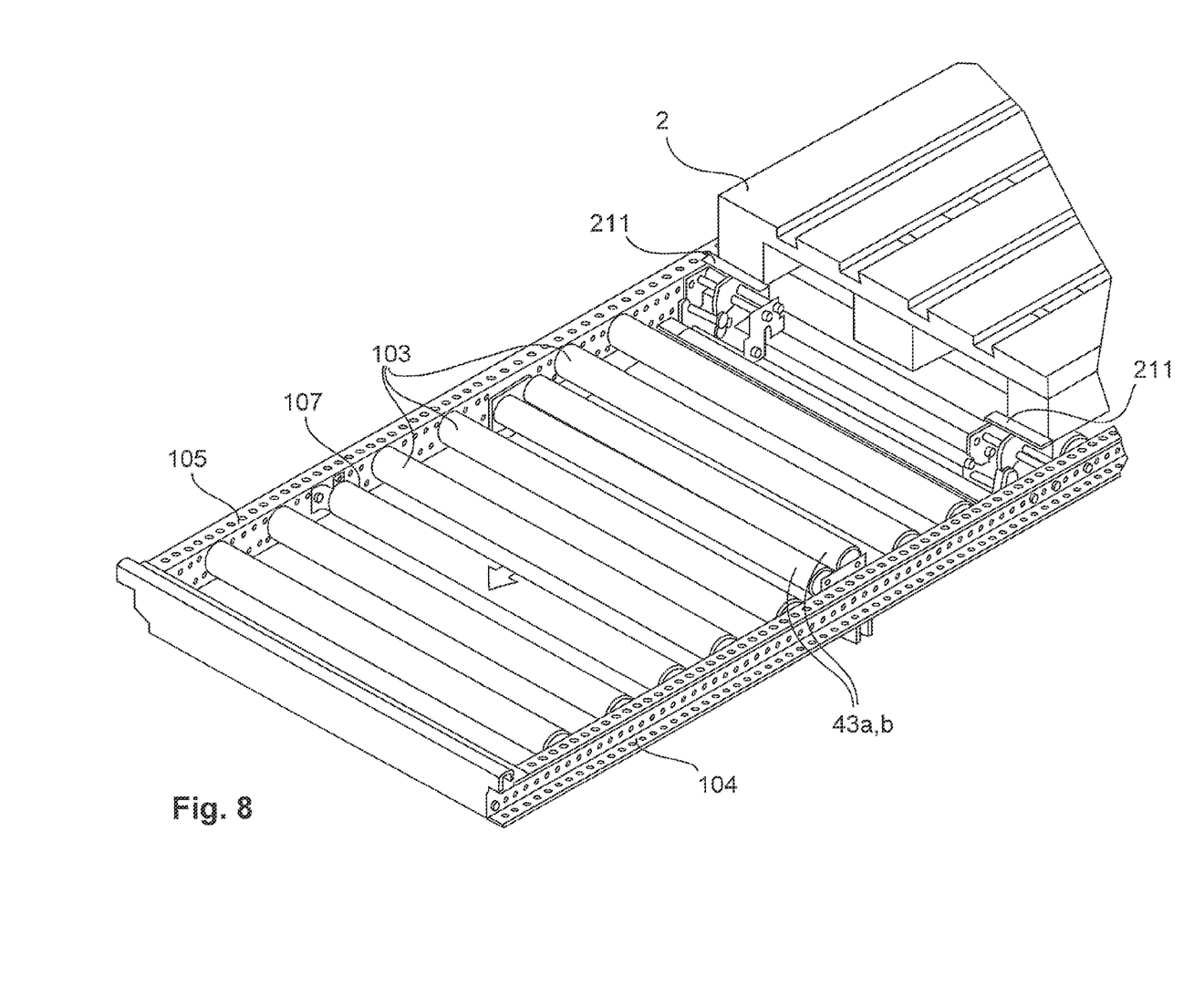
FIG. 8 shows a perspective detailed view of the embodiment according to FIG. 1, FIGS. 9 a-d show the process of separating conveyed items by means of the second embodiment.

FIGS. 7, 7a and 8 show a second embodiment of the invention. In this second embodiment, the conveyor section, the brake roller, the end stop and the actuating lever are provided in the same form as in the first embodiment according to FIGS. 1 to 6. Only the differences between said first embodiment and the second embodiment are discussed below.

In the second embodiment, the locking element is formed by a locking lever 220 which is pivotably mounted about a locking axle 222. Said locking lever 220 has a roller 224 at its opposite end from locking element axle 222, said roller being in contact with an arresting face 213 of a blocking lever 210 in the locking position shown in FIG. 7 and FIG. 9a. Blocking lever 210 is designed as a solid body and is pivotably mounted about a blocking lever axle 212. A blocking face 211 is formed on the blocking lever, said blocking face extending in the locking position across the support surface of the roller conveyor section.

Figures 9A, 9B:
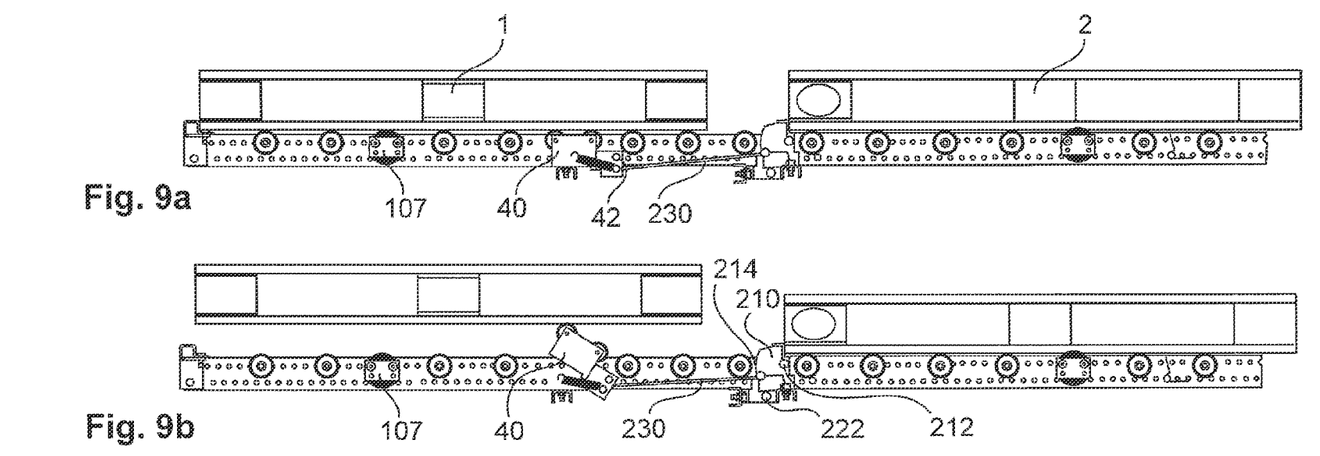

An unlocking face 216 is formed adjacent to the arresting face 213 of blocking lever 10.

Figure 9C:
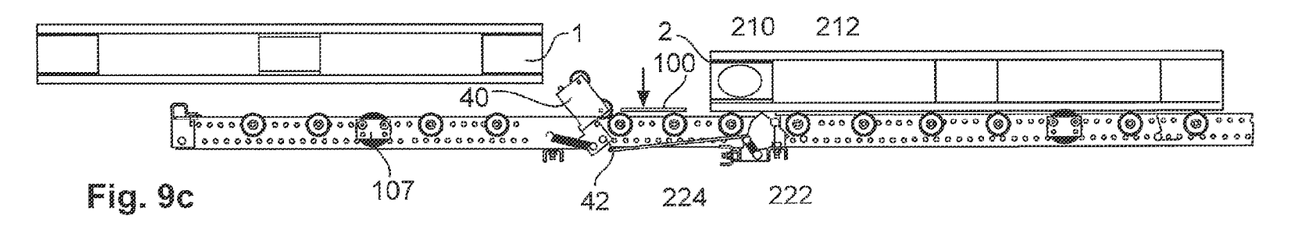
Figure 9D:
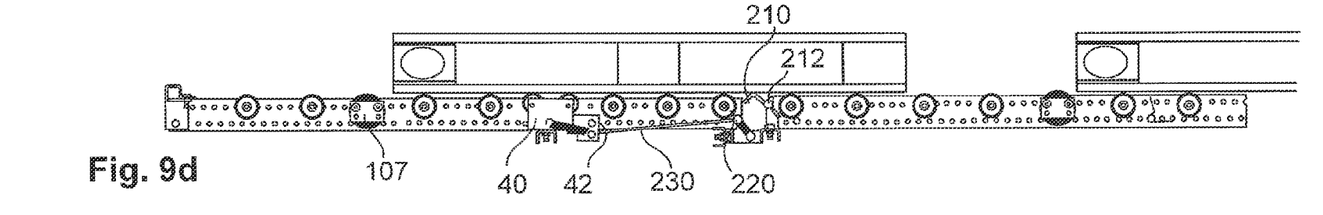
Figure 10:
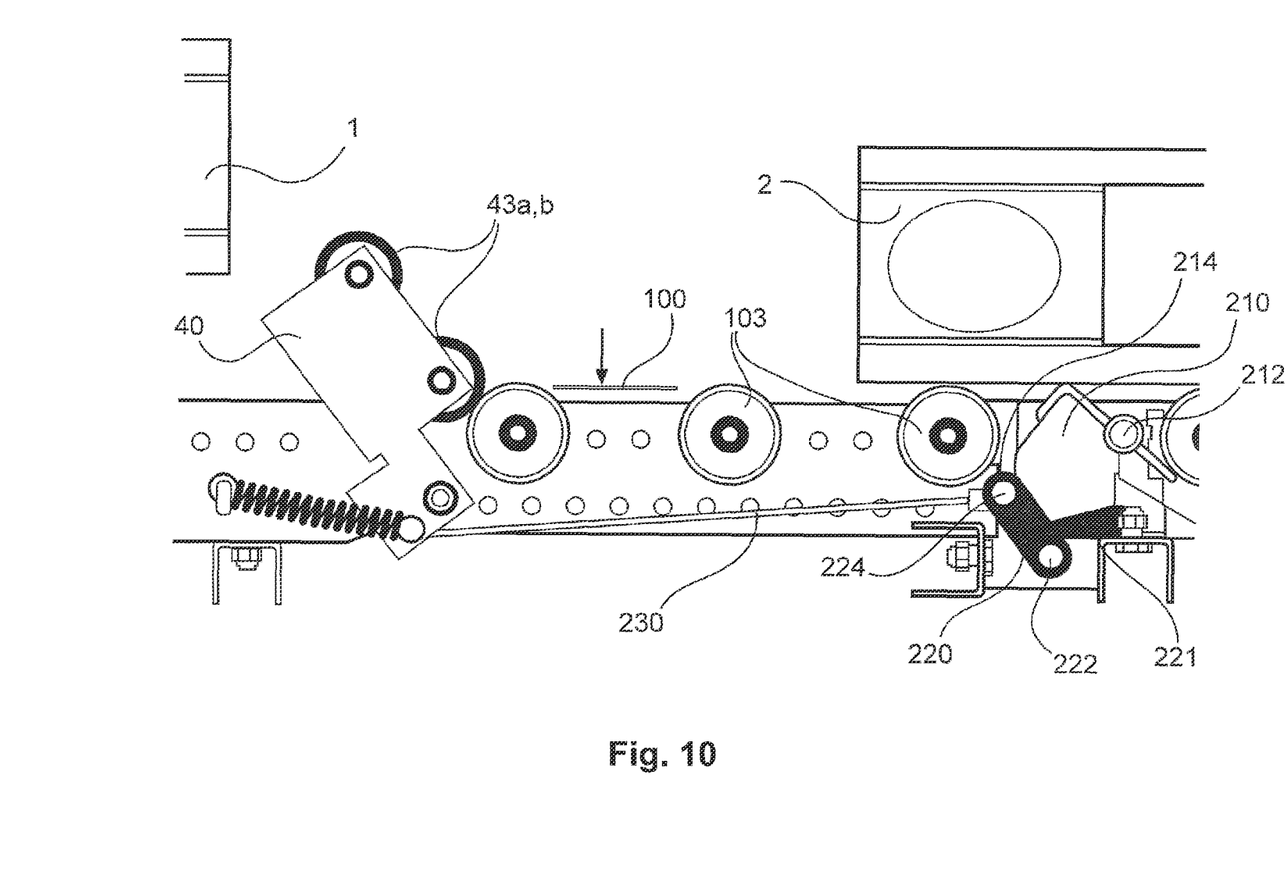
FIG. 10 shows a detailed view of a section from FIG. 9c.

If locking lever 220 is pivoted by means of a traction cable 230 from the position shown in FIGS. 7 and 9a,b into an unlocking position as shown in FIGS. 9c and 9d, the arresting face 213 of blocking lever 210 is no longer in contact with roller 224 of the locking lever. Instead, roller 224 of the locking lever rolls along the unlocking face 216 of the blocking lever and thus allows the blocking lever to be pivoted out of the blocking position shown in FIGS. 9a,b into the release position shown in FIGS. 9c,d. As before, this allows conveyed item 202 to be conveyed out of the waiting position and into the end position.

Figure 11:
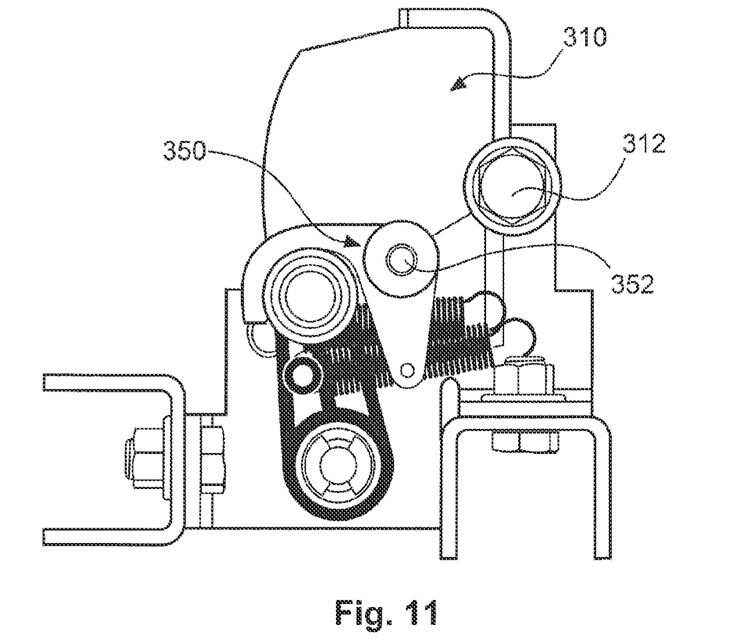
FIG. 11 shows a side view of a detail of a third embodiment in a locking position.
Figure 12:
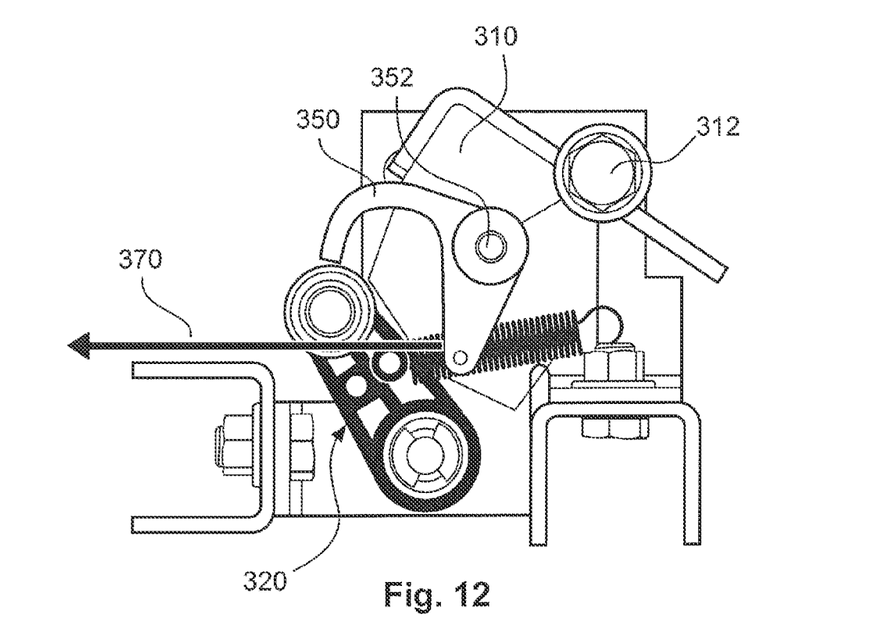
FIG. 12 shows a view according to FIG. 5, in a release position.

A further development of the invention is shown in FIGS. 11 and 12. This third embodiment is based in principle on the second embodiment described in the foregoing. However, the third embodiment differs from the second embodiment in that a locking hook 350 is provided in addition to a locking lever 320. Locking hook 350 is pivotably mounted about a locking hook axle 352 and is mechanically coupled to the actuating lever by a traction cable 370. Due to the traction acting along traction cable 370, the locking hook is pivoted out of a secured position as shown in FIG. 11, in which it prevents any pivoting movement of locking lever 320, into an unsecured position as shown in FIG. 12, thus allowing a pivoting movement of locking lever 320 out of the locking position into the unlocking position. This third embodiment of the invention provides an additional securing position which can reliably prevent any unintentional or premature release of the conveyed item out of the waiting position.

The embodiments according to the invention allow even heavy items to be held reliably in the waiting position, without any all too strong forces acting between the individual components, in particular between the blocking lever, the locking lever and the actuating lever, and thus allowing reliable and reproducible triggering of the blocking lever even when heavy items are being conveyed.

The invention claimed is:

1. A roller conveyor module provided with a separation mechanism for a gravity-actuated roller conveyor system, comprising:

a conveyor section consisting of a plurality of conveyor rollers arranged one behind the other, wherein said conveyor section forms an upper support surface for conveyed items and is defined by the perimeter of the conveyor rollers;

a movable blocking lever, wherein the blocking lever is pivotably mounted about a blocking lever axle located below the support surface, the blocking lever comprising an arresting face, a locking face adjoining said arresting face, and a blocking portion, wherein said blocking portion:

extends in a blocking position across the support surface and causes a conveyed item on the support surface to be blocked, and can be pivoted to below the support surface or is located below the support surface in a release position and does not cause a conveyed item on the support surface to be blocked;

a movable locking element comprising a locking face, which in a locking position is in contact with the arresting face and prevents movement of the blocking lever out of its blocking position in the direction of the release position, and in an unlocking position allows movement of the blocking lever out of its blocking position in the direction of the release position, a movable actuating lever disposed downstream from the blocking lever in the conveying direction of the conveyor module, comprising:

an actuation portion which extends in a trigger position across the support surface, and in a holding position lies below or in the support surface, a coupling mechanism for mechanically coupling the actuating lever to the locking element in such a way that, as a result of said coupling action, said locking element is moved, or more particularly is pivoted into the unlocking position when the actuating lever is in the trigger position and is moved into the locking position when the actuating lever is in the holding position; and a roller disposed on the locking element, wherein the locking element and the blocking lever are moveably mounted in such a way that the roller rests in the locking position against the arresting face of the blocking lever, thereby blocking any pivoting movement of the blocking lever in a direction in which the blocking face moves in the conveying direction, and the roller rolls in the unlocking position along unlocking face when the blocking lever is pivoted in a direction in which the blocking portion moves in the conveying direction.

2. The roller conveyor module of claim 1, wherein:

the blocking lever in the release position is pivoted in relation to the blocking position about said blocking lever axle, the locking element is pivotably disposed about a locking element axis located below the support surface, and/or the actuating lever is pivotably mounted about an actuating lever axle located below the support surface.

3. The roller conveyor module of preceding claim 1, wherein the locking element comprises a locking lever and a locking hook which can be moved relative to the locking lever, the locking hook is mechanically coupled to actuating lever and the locking lever and the locking hook are moveably mounted in such a way that the locking hook is hooked in a securing position into locking lever, and the locking lever is fixed in the locking position in which said locking lever blocks any pivoting movement of the blocking lever into the release position, and the locking hook is moved, or more particularly is pivoted by the coupling to the actuating lever out of the secured position into an unsecured position, thereby releasing a pivoting movement of the locking lever out of the locking position and into the unlocking position when the actuating lever is moved out of its holding position into the release position.

4. The roller conveyor module of claim 1, wherein the locking element has a locking face and an unlocking face adjacent to said locking face, the locking element and the blocking lever being moveably mounted in such a way that the roller rests in the locking position against the locking face, thereby blocking any pivoting movement of the blocking lever in a direction in which the blocking portion moves in the conveying direction.

5. The roller conveyor module of claim 1, wherein:

the blocking lever is biased into the blocking position by a counterweight or a biasing force, the locking element is biased into the locking position by a counterweight or a biasing force, and/or the actuating lever is biased into the trigger position by a counterweight or a biasing force.

6. The roller conveyor module of claim 1, wherein the actuating lever is spaced apart from the blocking lever by less than the length of a Europallet.

7. The roller conveyor module of claim 1, wherein the actuating lever is connected to the locking element by a push or pull rod or by a traction cable.

8. The roller conveyor module of claim 1, further comprising an end stop disposed at the downstream end of the roller conveyor module in the conveying direction, said end stop preferably being spaced apart from the blocking lever by more than the length of a Europallet.

* * * * *